May 24, 1949.　　　C. C. S. LE CLAIR　　　2,471,069
OIL OR LIQUID FILTER
Filed March 19, 1945　　　　　　　　　　　　4 Sheets-Sheet 1

Inventor:
Camille Clare Sprankling Le Clair
By Hinkle, Horton, Ahlberg, Hansmann & Wupper
Attorneys.

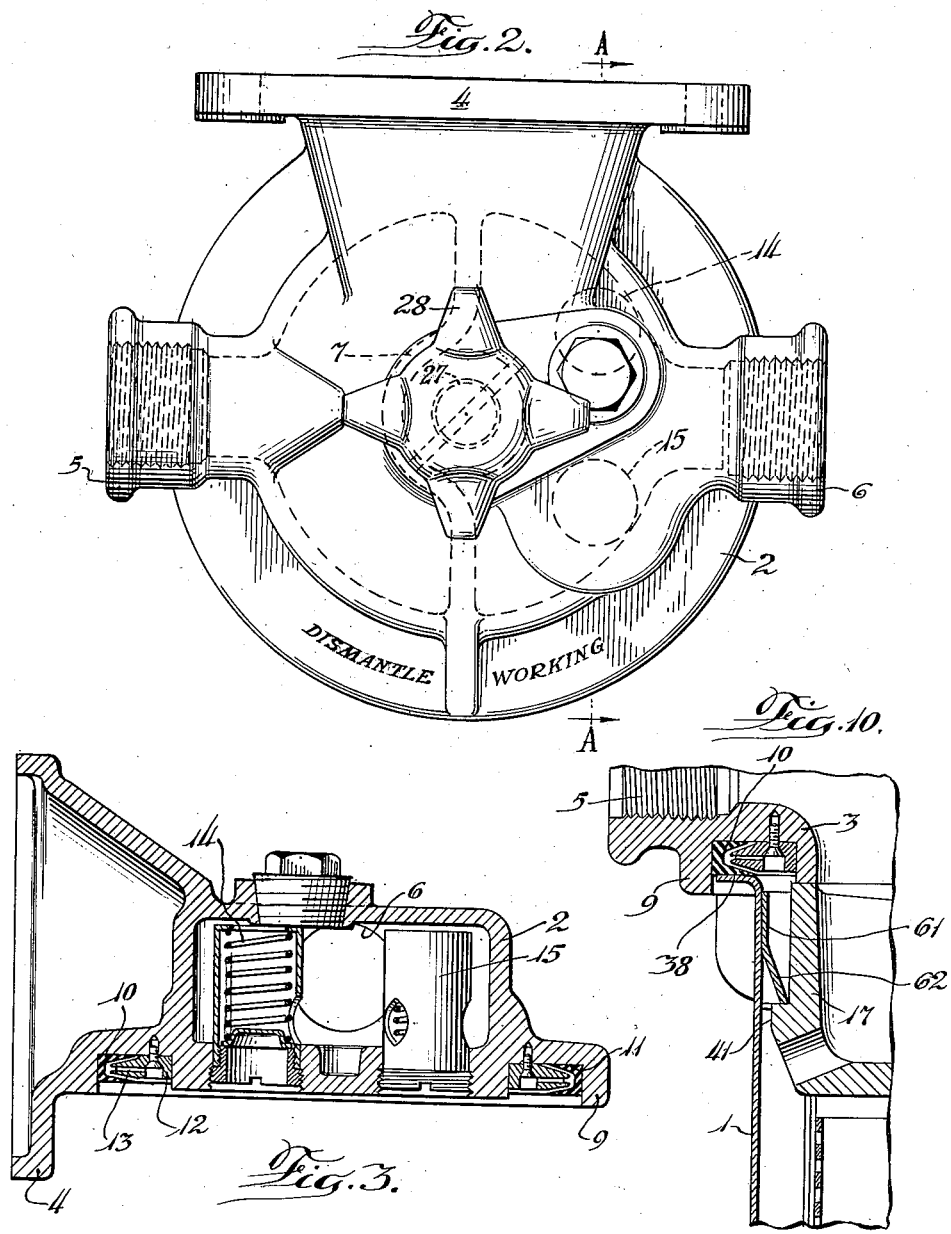

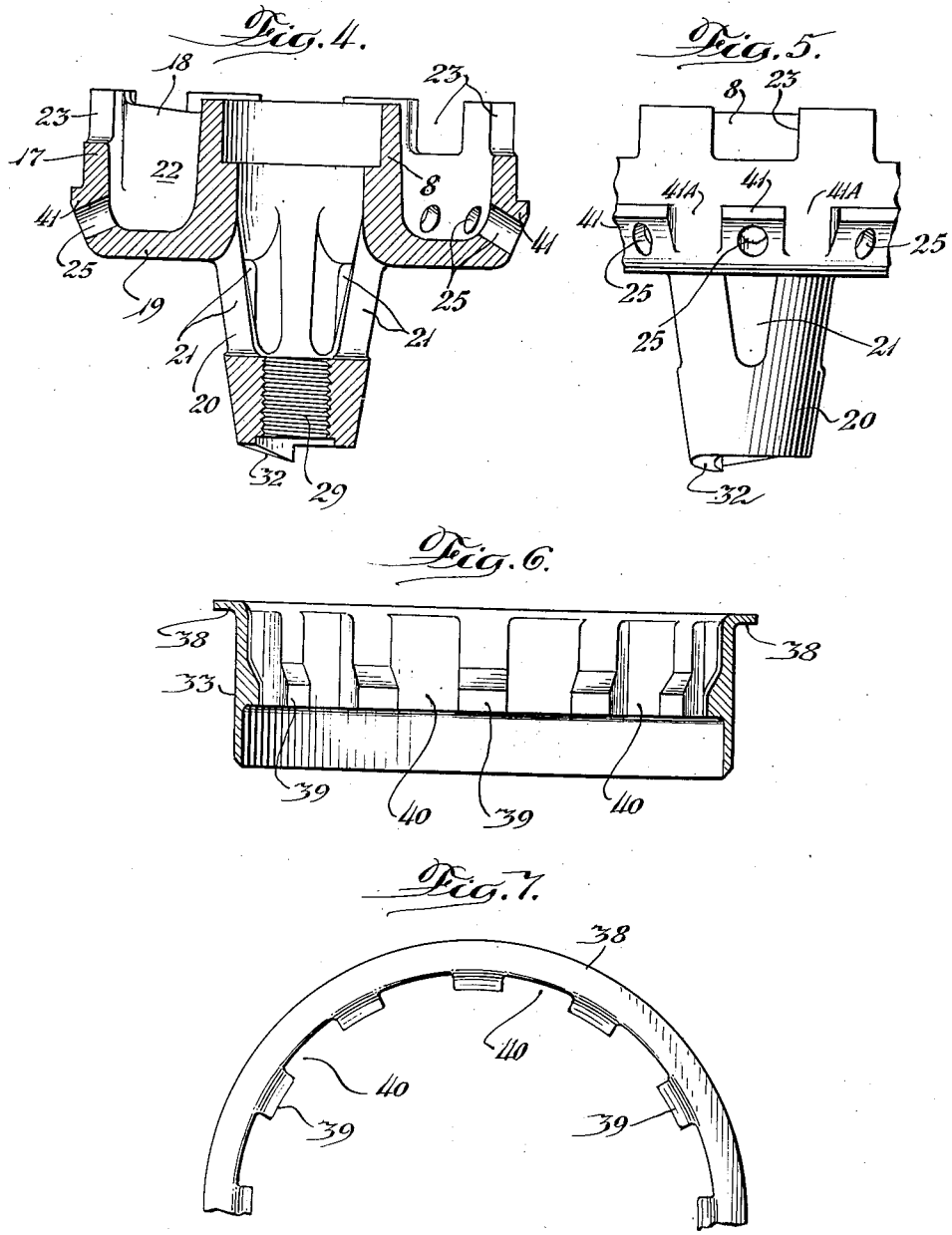

May 24, 1949.　　　C. C. S. LE CLAIR　　　2,471,069
OIL OR LIQUID FILTER
Filed March 19, 1945　　　　　　　　　　　　4 Sheets-Sheet 4
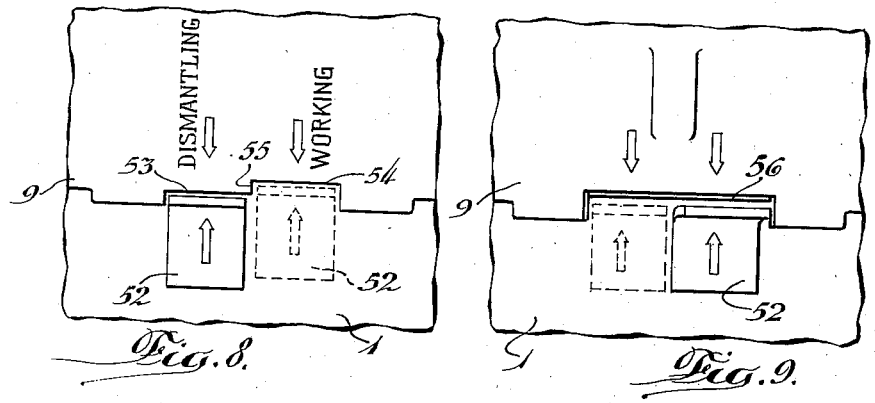
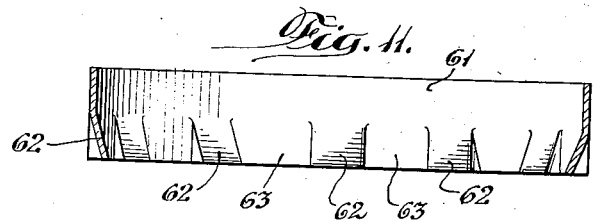
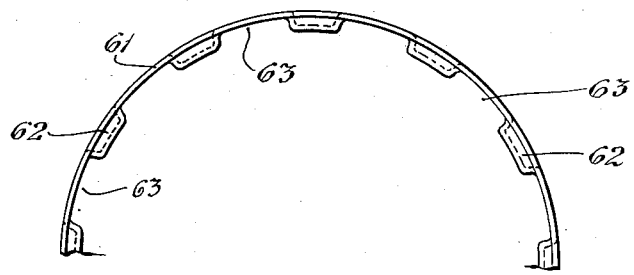
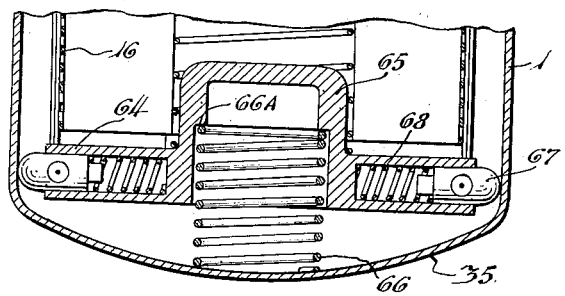
Inventor:
Camille Clare Sprankling Le Clair
By Hinkle, Horton, Ahlberg, Hansmann & Nupper
Attorneys Patented May 24, 1949

2,471,069

UNITED STATES PATENT OFFICE 2,471,069

OIL OR LIQUID FILTER

Camille Clare Sprankling Le Clair, Acton, London, England, assignor to Tecalemit Limited, Brentford, England, a corporation of Great Britain Application March 19, 1945, Serial No. 583,585
In Great Britain March 28, 1944

12 Claims. (Cl. 210—164)

This invention relates to filters for oil or other liquids, of the type in which an annular fabric or other type of filter element is enclosed in a container which is detachably attached to a fixed filter head having an inlet for the unfiltered oil or liquid and a separate outlet for the filtered oil or liquid, the flow of the oil or liquid from the inlet to the outlet taking place either from the outside of the filter element inwardly through the latter to the interior of the element or from the inside of the element outwardly through the element.

Various methods of attaching a container to a head are known, two of the most common being (a) by nuts engaging a ring of studs which pass through the head and are screwed into a flange on the container and (b) by a single centre attachment or locking bolt or screw which passes through the head and the container and engages with a nut or tapped boss attached to or integral with the base of the container.

The first mentioned method is slow and cumbersome in use, but it has the advantage that it does not impose any serious secondary stresses on the container, the shell of which is stressed in tension both circumferentially and longitudinally. Although the second method is quick in action it has the disadvantage that it produces secondary stresses due to the concentrated force applied at the centre of the base of the container and also due to the fact that whereas the circumferential stress in the container remains tensile, the longitudinal stress is converted to compression. This combination of a tensile and a compression stress at right angles to each other is more disadvantageous to the metal than two tensile stresses so disposed. The above disadvantages are all accentuated in the larger sizes of filter.

Objects of the present invention, therefore, are to combine the advantages of the above mentioned two methods, and to provide a means whereby the quick action of the centre or locking bolt method of attachment may be utilized without the production of adverse stresses as mentioned above.

Other objects and advantages of the present invention will be apparent from the following description taken in conjunction with the accompanying drawings in which:

Fig. 2 is a plan view;

Fig. 3 is a section on the line A—A in Fig. 2;

Fig. 4 is a sectional view of the subsidiary head part of the filter;

Fig. 5 is a fragmentary elevational view of the subsidiary head part;

Fig. 6 is a sectional view of the upper part of the container shown in Fig. 1;

Fig. 7 is a fragmentary plan view of the upper part of the container as shown in Fig. 6;

Fig. 8 is a fragmentary elevational view of the main head part and container and shows one means of retaining the main head part and container against relative rotation;

Fig. 9 shows a modification of the retaining means;

Fig. 10 is a fragmentary sectional view of a modified filter in which the container is fitted internally with a separate ring formed with lugs or ledges adapted to cooperate with lugs or ledges on the subsidiary head part;

Fig. 11 is a sectional view of the separate lug ring;

Fig. 12 is a fragmentary plan view of the ring shown in Fig. 11; and

Fig. 13 is a fragmentary sectional view of the bottom part of a filter fitted with a modified form of bottom pressure plate for the filter element.

Figure 1:
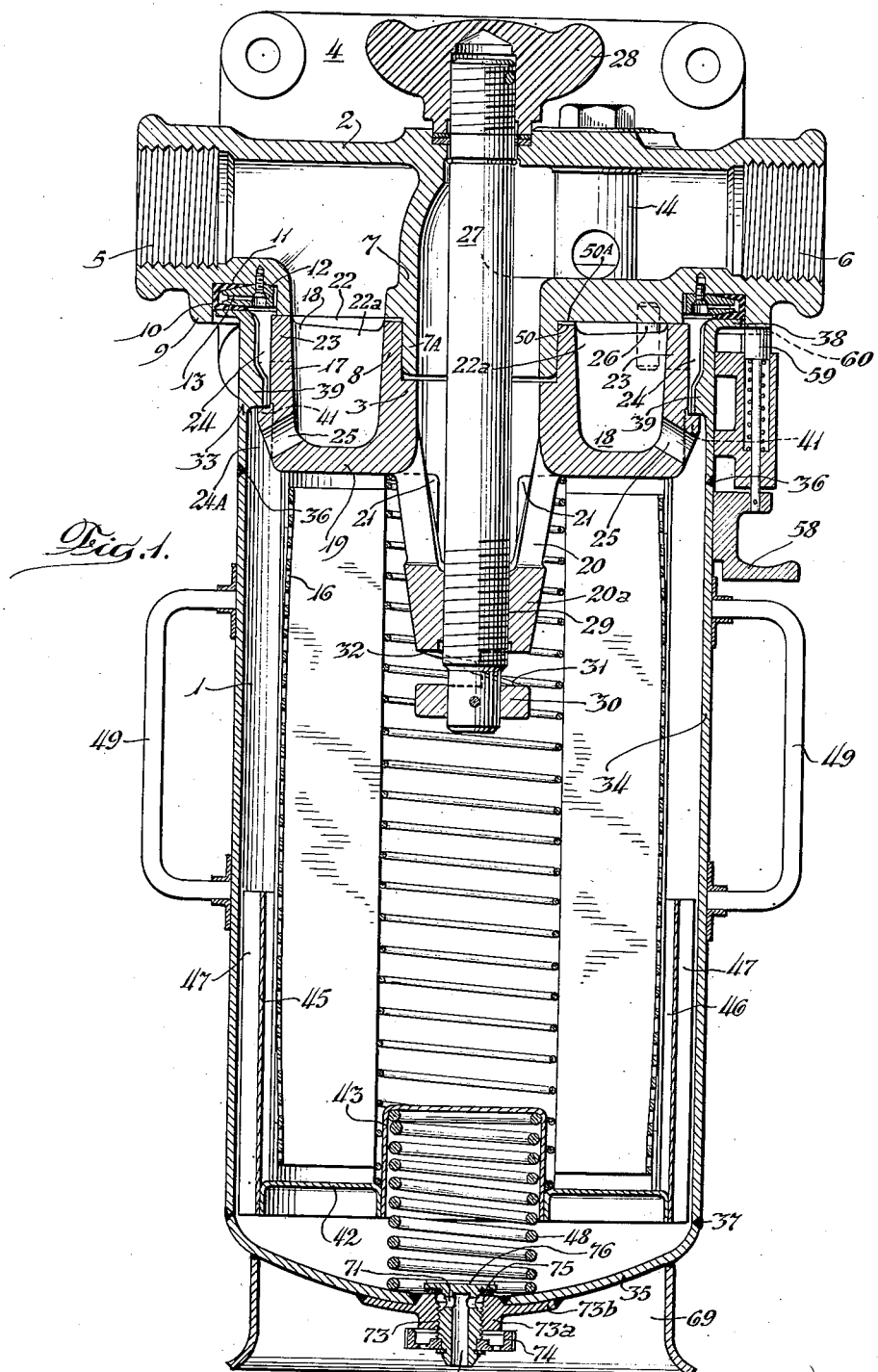
Fig. 1 is a medial sectional view of the filter.

Referring first to Figs. 1 to 3 of the drawings:

The open upper end of the container 1 is closed by means of relatively movable, superimposed main and subsidiary head parts 2 and 3 which may also be detached from each other if so desired. The main head part is formed with a fixing bracket 4, an inlet branch 5 and an outlet branch 6, part of the latter being formed as a hollow boss 7 projecting downwardly from the top of the head substantially at right angles thereto. This boss is machined externally at its lower end so as to form a reduced end 7A adapted to engage in a seat formed in the central ring part 8 of the subsidiary head part. In the lower face of a bottom flange 9 on the main head part, a U-shaped sealing ring 10 is arranged in an annular groove 11 formed in said face, the sealing ring being lodged relatively loosely in the groove with its lips directed inwardly towards the axis of the head and engaged loosely over the rim of a supporting ring 12 fixed in the groove 11. The ring 12 is formed with a number of radial ports 13 whereby the sealing ring 10 may be subjected to the pressure of the oil fed into the container. The main head part is provided with by-pass valves 14 and 15 whereby, in the event of the pressure difference across the filter element 16 exceeding a predetermined figure, unfiltered oil is permitted to escape from the inlet 5 to the outlet 6.

The subsidiary head part 3 comprises the central ring 8 referred to above and an outer ring or flange 17 which is spaced from, and concentric with, the central ring and is connected to the latter by a number of radial ribs 18 and by a flat base 19 which becomes the top pressure plate and forms a closure for the top end of the filter element. From the flat base, and coaxial therewith, a hollow conical projection 20 extends downwardly into the filter element and this projection, which is terminated in a boss 20a is formed with a number of spaced slots 21, see also Figs. 4 and 5, through which filtered oil which has passed laterally through the filter element 16 can pass to the outlet 6 upwardly through the hollow central ring 8 of the subsidiary head part and through the hollow boss 7 projecting downwardly from the top of the main head part 2. The annular space 22 in the subsidiary head part between the outer and central rings 17 and 8 below the lower face of the main head part 2 and also the spaces 22a between the ribs 18 communicate with the inlet branch 5 of the main head part, and a number of spaced openings 23, see also Figs. 4 and 5, are formed in the upper part of the outer ring or flange 17 so that some of the oil entering the annular space 22 and the spaces 22a may pass into the annular space 24 between the outer ring part and the top end of the container 1 and thence downwardly to the outside of the filter element 16. The lower part of the outer ring 17 is also provided with a number of spaced ports or passages 25 whereby oil entering the annular space 22 and the spaces 22a can flow into the annular space 24A between the container and the outside of the filter element just above the top of the latter.

In order to ensure correct circumferential registration between the main and subsidiary head parts 2 and 3, a pin 26, Fig. 1, screwed into the lower face of the main head part engages in a hole in one of the aforesaid radial ribs 18 connecting the central and outer rings 8 and 17 of the subsidiary head part.

The main and subsidiary head parts are held in detachable and relatively movable engagement by means of a centre bolt 27, Fig. 1, which is coaxial with the filter element 16 and extends from a position above the outside of the top of the main head part 2 to a position below the boss 20a on the subsidiary head part. A hand knob 28 is fixed upon the outwardly projecting end of the bolt and, toward its bottom end, the latter is screwed into a threaded hole 29 formed in the boss 20a. Below the screwed part, the bolt is furnished with a collar stop 30 formed with a lug 31 adapted to engage with a lug 32 formed on the boss 20a. The purpose of these lugs is referred to hereinafter.

Referring to Figs. 1, 6 and 7, the container is made up of an upper ring-shaped part 33, an intermediate cylindrical part 34 and a bottom cup-like part 35, the upper and intermediate parts being welded together at 36 and the intermediate and lower parts at 37.

The upper part 33 of the container is formed with an annular, outwardly-directed flange 38, see Fig. 1, which, when the parts of the filter are assembled and clamped together, is adapted to make contact with the bottom face of the U-section sealing ring 10. In order that the flange 38 may be pulled upwardly into contact with the sealing ring the upper part 33 of the container is formed with a plurality of circumferentially spaced, inwardly projecting locking lugs or ledges 39, Figs. 1, 6 and 7, separated by recesses 40. A plurality of circumferentially spaced, outwardly projecting lugs 41, see also Figs. 4 and 5, are formed upon the outside of the outer ring 17 of the subsidiary head part 3, near the base 19 of the latter, the arrangement being such that the locking ledges 39 formed upon the upper part 33 of the container can be passed endwise through the recesses 41A separating the lugs 41 on the outer ring 17 and thereafter engaged upon the tops of the lugs 41 by turning the container 1 through a predetermined angle about its axis.

The annular filter element 16, which may be constructed from filter fabric or of another filtering medium or media mounted upon a perforated metal support, is supported within the container upon an annular bottom pressure plate 42, which is provided with a central cylindrical portion 43 having a closed end 44. The pressure plate forms a closure for the bottom end of the filter element and has mounted upon it a cylindrical sludge pot 45 which surrounds the lower portion of the filter element 16 so that an annular space 46 is provided between the pot and the filter element. The sludge pot is formed with a number of longitudinal, external guiding fins 47 which are of such a width and are so spaced circumferentially that they can be passed upwardly through the recesses 40 in the upper part 33 of the container when the sludge pot is to be inserted into or withdrawn from the container. The bottom pressure plate 42 is urged upwardly by a coil spring 48 reacting between the base 35 of the container and the end 44 of the cylindrical portion 43. The coil spring 48 not only forces the bottom pressure plate 42 into sealing engagement with the lower end of the filter element 16 but also forces the top of the filter element against the top pressure plate which, as mentioned above, is constituted by the bottom face of the base 19 of the subsidiary head part 3.

In order to assemble the filter, a filter element 16 is lowered into the container 1 and adjusted in place upon the lower pressure plate 42 within the sludge pot 45, being located in place by the cylindrical portion 43. The bolt 27 is rotated by using the knob 28 until the lug 32 on the boss 20a on the subsidiary head part 3 engages circumferentially the lug 31 on the stop collar 30. The main and subsidiary head parts are then at their maximum designed distance apart. The container 1, with the filter element 16 therein, is engaged over the subsidiary head part 3, the container being held by the operator by two external handles 49. The lugs or ledges 39 in the upper part 33 of the container are passed through the recesses 41A, Figs. 4 and 5, between the projections 41 on the outer ring 17 of the subsidiary head part. During this operation, the upper end of the filter element 16 will contact with the upper pressure plate, i. e., the base 19 of the subsidiary head part, and further upward motion of the container will cause the spring 48 acting on the bottom plate 42 to be compressed, thereby exerting the designed endwise pressure on the filter element. When the lugs or ledges 39 are above the projections 41 on the subsidiary head part, the container is turned through an angle equal to the width of one lug, i. e., approximately 15°, so that the lugs or ledges 39 rest upon the lugs or projections 41 on the subsidiary head part.

The centre bolt 27 is now turned in such a direction that it acting as a cam raises the subsidiary head part 3 with the container 1 and the filter element 16 all together, until the upper face of the outer ring 17 of the subsidiary head part is clamped against the lower face of the main head part 2. These two faces are designed to act as stops and when they come into contact, the annular flange 38 at the top of the container is in its correct position relative to the U-section sealing ring 10, which latter, under the influence of the oil pressure, forms an oil-tight seal between the container and main head part. At the same time, a sealing ring 50 fitted upon the top of the central ring 8 of the subsidiary head part is compressed sufficiently to form an oil-tight seal with a shoulder 50A on the said hollow outlet boss 7 of the main head part, between the inlet and outlet sides of the filter element.

To ensure the correct circumferential registration of the container and the main head part, a registering device is provided. Referring to Fig. 8, this comprises a bracket or pad 52 which is attached by brazing or welding to the container 1 and is so placed (in the vertical direction) that during the upward passage of the container onto the subsidiary head part 3 as described above, the bracket would interfere with the lower face of the circumferential flange 9 on the main head part, before the said lugs or ledges 39 in the container are clear of the lugs 41 on the subsidiary head part and, except as explained below, would prevent these parts being brought into engagement as previously described.

In the circumferential direction, the member or bracket 52 is situated in the front of the container 1 midway between the handles 49 and thus faces the operator when he grips the handles. In front of the main head part 2, also facing the operator, the flange 9 on the main head is notched at 53 sufficiently widely to permit the registering bracket 52 to enter and sufficiently high to permit the container to pass upwardly far enough to bring the lugs or ledges 39 in the container and the lugs 41 on the subsidiary head part clear of one another. This notch is marked "Dismantling."

A second notch 54, deeper than the "Dismantling" notch 53 and marked "Working," is cut immediately or closely alongside the other notch 53, which latter is widened so that the two notches form one stepped notch, having a step or shoulder 55 substantially at its mid point. This permits the bracket 52, and with it the container 1, to turn circumferentially sufficiently to bring the lugs or ledges 39 in the container and the projections 41 on the subsidiary head part into full and proper engagement with each other.

Thereafter, when the cam means or center bolt 27 is tightened so as to raise the subsidiary head part 3 relative to the main head part 2 the bracket 52 rises upwardly in the "Working" notch 54 which is deep enough and wide enough and so placed as to accept it without interference, when the subsidiary and main head parts come into contact. When so assembled the container cannot be turned either inadvertently by hand or by vibration or by other causes, because the registering bracket 52 is held against turning in one direction by the side of the "Working" notch and in the other direction by the shoulder 55 formed between the "Working" and "Dismantling" notches.

It will be understood that two or more such registering devices spaced around the circumference of the flange on the main head part may be used is desired.

In a modification, shown in Fig. 9, a single notch 56 of depth equal to the "Working" notch 53, Fig. 8, and of width equal to the "Dismantling" and "Working" notches 53 and 54 together is used. Such a notch 56 while it prevents the registering bracket 52 from turning in one direction does not, owing to there being no shoulder, such as 55, between the "Working" and "Dismantling" parts of the notch, prevent it turning in the other direction.

To supply this lack a vertically slidable thumb latch 58, Fig. 1, placed conveniently adjacent to one of the handles 49 is supplied. This latch comprises a spring urged bolt 59 which, when the container is turned into the "Working" position, engages a notch 60 in the flange 9 on the main head part 2 to prevent rotation and which can be released by the thumb of the operator when gripping one of the handles.

It will be appreciated that constructional details of the invention may be varied. For example, referring to Figs. 10 to 12, the container 1 may be made in the form of a one-piece member fitted internally at its upper end with a separate lug ring 61 of relatively substantial depth. The bottom edge of the ring 61 is formed with a number of circumferentially spaced, inwardly projecting lugs or ledges 62 separated by recesses 63. The lugs or ledges serve the same purpose as the lugs or ledges 39 on the upper part 33 of the container 1 shown in Figs. 1, 6 and 7, and when the filter is assembled they rest upon the lugs 41 on the outer ring 17 of the subsidiary head part 3.

Further, as shown in Fig. 13, the bottom pressure plate may be made of cast or forged construction and may consist of a ring-shaped member having a base 64 and a central, upwardly projecting hollow boss 65 formed integrally with it. The plate is urged upwardly by a coil spring 66 which reacts between the base 35 of the container 1 and a shoulder 66A in the central boss. The base 64 of the pressure plate is smaller in diameter than the internal diameter of the container and is provided with a number of circumferentially spaced radial stops 67 which are pressed outwardly by springs 68 and thus serve not only to center the pressure plate within the container but also, by their friction, to provide a measure of security against the plate falling out during dismantling.

If so desired, the base 35 of the container may be provided with a stand 69 as shown in Fig. 1. It may also be provided with a drain valve 70 provided with lateral and axial ports 71 and 72. The drain valve is screwed into a threaded hole 73 formed in a valve body 73a and it can be screwed inwardly and outwardly by means of a knurled operating knob 74. When screwed sufficiently far inwardly, oil can discharge from the container through the ports 71 and 72. When it is screwed sufficiently far outwardly, however, escape of oil is prevented, because a sealing washer 75 fitted below a head 76 on the valve is pressed into liquid-tight contact with the inner face of the valve body around the hole 73. The valve body 13a may for convenience be formed with a central boss sufficiently deep to give ample thread engagement with the valve 70 and a flange part 13b which may be welded or brazed to the container base as shown.

Although the invention has been described above with reference to a filter in which the unfiltered oil flows inwardly through the filter element toward the centre of the latter, it will be obvious that the invention is equally applicable to filters in which the flow of oil or liquid takes place outwardly from the inside of the filter element through the latter to the outlet for filtered oil or liquid.

I claim:

1. A filter of the type described, comprising a container, a head formed of a main head part and a subsidiary head part, an inlet passage in said main head part, an outlet passage in said main head part, a filter element in said container, means for holding said filter element in contact with said subsidiary head part, ducts in said subsidiary head part interconnecting said inlet passage and the interior of said container and through which liquid can flow into said container around said filter element, other ducts in said subsidiary head part, interconnecting the interior of said container and said outlet passage and through which the filtered liquid can flow to said outlet passage, means rotatably mounted in and carried by said subsidiary head part, said means having a stem part projecting through said main head part and rotatable therein, means on said projecting stem part for rotating said means, said stem part being movable longitudinally relative to said head parts upon rotation of said means, said main and subsidiary head parts being drawn into clamping engagement upon a first rotation of said means and being spaced apart a predetermined distance while still being physically connected upon a second rotation of said means, a plurality of circumferentially spaced lugs carried by said container adjacent its upper end, and a plurality of similarly circumferentially spaced lugs carried by said subsidiary head part, both sets of lugs being spaced sufficiently to pass the lugs of the other set therebetween and being arranged with cooperating faces adapted to face and engage each other and to hold said container to said main head part, whereby said container may be removed from or connected to said subsidiary head part when the head parts are spaced apart and secured in working position when the said parts are drawn together, said lugs being rendered effective for holding said container in this latter position by said rotatably mounted means.

2. The combination claimed in claim 1, wherein said rotatably mounted means comprises a center bolt which is turnably mounted in said main head part and has a screw-threaded connection with said subsidiary head part so that said parts may be drawn together by turning said center bolt.

3. The combination set forth in claim 1, including means forming a liquid-tight seal between said main head part and said container, said seal forming means being carried by said main head part and being rendered effective when said rotatably mounted means holds said container in working position.

4. A filter of the type described, comprising a filter head, a container, a filter element in said container, said head comprising a main head part and a subsidiary head part, means holding said filter element in contact with said subsidiary head part and within said container so that there is an inlet space surrounding said filter element, said main head part having an inlet passage and an outlet passage, said main head part having an integral hollow boss connected to said outlet passage, said subsidiary head part being arranged coaxial with said main head part and having an inlet passage interconnecting said inlet passage in said main head part and said inlet space in said container, said subsidiary head part including an inner ring slidably arranged on said boss, an outer ring spaced radially from said inner ring, a base connecting said inner and outer rings and forming an upper pressure plate against which said filter element is held, and a hollow projection communicating with said hollow boss, said hollow projection having an opening leading to the interior of said filter element, said hollow projection terminating in a boss having a threaded opening therein, abutment means formed in said container and complementary abutment means on said outer ring for holding said container against said main head part, and clamping means turnable in said main head part and carried by said subsidiary head part and threadedly engaging said threaded hollow projection to secure said subsidiary head part to said main head part and to engage both said abutment means with each other to hold said container against said main head part.

5. A filter of the type described, comprising a filter head, a container, said head comprising a main head part and a subsidiary head part, said main head part having an inlet passage and an outlet passage, a central hollow boss formed on said main head part in communication with said outlet passage, said subsidiary head part including an inner ring slidably arranged on said hollow boss, an outer ring spaced radially from said inner ring and forming an annular space in said subsidiary head part in communication with said inlet passage, and a base connecting said inner and outer rings, a filter element in said container, said base forming an upper pressure plate for said filter element, means holding said filter element against said base and within said container so that there is an inlet space surrounding said filter element, a plurality of ports in said outer ring through which said annular space in said ring communicates with the inlet space in said container surrounding said filter element, a hollow projection integral with said base provided with a threaded hole and in communication with said hollow boss on said main head part, a plurality of ports in said hollow projection placing the interior of said filter element in communication with said outlet passage, abutment means carried by said container and complementary abutment means formed on said outer ring for holding said container against said main head part, and clamping means carried by said subsidiary head part and threadedly engaging said threaded hollow projection for securing said subsidiary head part to said main head part and for engaging said complementary abutment means to hold said container against said main head part.

6. The combination set forth in claim 5, including a sealing element interposed between said main head part and said container, said sealing element having a hollow face toward said space surrounding said filter element and thus being arranged to be acted upon by the pressure in said inlet space surrounding said filter element in said container so that its effectiveness in sealing against said container and main head part increases with an increase in the pressure of the liquid being filtered.

7. A filter of the type described, comprising a container, a head formed of a main head part and a subsidiary head part, an inlet passage in said main head part, an outlet passage in said main head part, a filter element in said container, means for holding said filter element in contact with said subsidiary head part and spaced from said container, ducts in said subsidiary head part interconnecting said inlet passage and the interior of said container and through which liquid can flow into said container around said filter element, other ducts in said subsidiary head part interconnecting the interior of said container and said outlet passage and through which the filtered liquid can flow to the outlet passage, a plurality of circumferentially spaced lugs carried by said container on the interior thereof adjacent its upper end, a plurality of similarly circumferentially spaced lugs carried by said subsidiary head part, both sets of lugs being spaced sufficiently to pass the lugs of the other set therebetween and being arranged with cooperating faces adapted to face and engage each other and to hold said container against said main head part, cam means rotatably mounted in and carried by said subsidiary head part, said cam means having a stem part projecting through said main head part and rotatable therein, and means carried by said stem part for rotating said cam means and reacting against said main head part, said stem part being movable longitudinally relative to said subsidiary head part upon rotation of said cam means, said main and subsidiary head parts being drawn into clamping engagement and said container being drawn against said main head part upon a first rotation of said cam means and said parts being spaced apart a predetermined distance while still being physically connected upon a second rotation of said cam means whereby said container may be withdrawn by turning it so that said lugs are disengaged and so that one set passes by the other set.

8. A filter of the type described, comprising a filter head, a container, a filter element in said container, said head comprising a main head part and a subsidiary head part, said main head part having an inlet and an outlet, said subsidiary head part having an inlet passage connected with said inlet and having other passages communicating with the interior of said container on the influent side of said filter element, said subsidiary head part having an outlet passage communicating with the interior of said container on the effluent side of said filter element and connected with said outlet, means to prevent relative rotation of said main and subsidiary head parts, a plurality of circumferentially spaced lugs carried by said container on the interior thereof adjacent its upper end, a plurality of similarly circumferentially spaced lugs carried by said subsidiary head part, both sets of lugs being spaced sufficiently to pass the lugs of the other set therebetween and being arranged with cooperating faces adapted to face and engage each other and to hold said container to said main head part, constraining means for securing said subsidiary head part to said main head part and for rendering said sets of lugs effective to hold said container against said main head part, said container being rotatable relative to said subsidiary head part to engage said lugs, and locking means to prevent relative rotation of said container and said subsidiary head part after engagement of said lugs, said locking means comprising a member fixedly mounted on the outside of said container, stepped notches formed in said head and adapted to be engaged by said member, said member being held in the deeper notch when said container is in the working position and being movable into the shallower notch during assembling and dismantling operations.

9. A filter of the type described comprising a filter head, a container, a filter element in said container, said head comprising a main head part and a subsidiary head part, said main head part having an inlet and an outlet, said subsidiary head part having an inlet passage connected with said inlet and having other passages communicating with the interior of said container on the influent side of said filter element, said subsidiary head part having an outlet passage communicating with the interior of said container on the effluent side of said filter element and connected with said outlet, means to prevent relative rotation of said main and subsidiary head parts, a plurality of circumferentially spaced lugs carried by said container on the interior thereof adjacent its upper end, a plurality of similar circumferentially spaced lugs carried by said subsidiary head part, both sets of lugs being spaced sufficiently to pass the lugs of the other set therebetween and being arranged with cooperating faces adapted to face and engage each other and to hold said container to said main head part, constraining means for securing said subsidiary head part to said main head part and for rendering said sets of lugs effective to hold said container against said main head part, said container being rotatable relative to said subsidiary head part to engage said lugs, and locking means to prevent relative rotation of said container and said subsidiary head part after engagement of said lugs, said locking means comprising a member fixedly mounted on the outside of said container, a notch formed in said head and adapted to receive said member, said notch being of such width and depth as to permit movement of said member therein during an assembling or a dismantling operation, a slidable bolt means mounted on the outside of said container, and a second notch formed in said head and adapted to receive said bolt means when said container is assembled in working position.

10. A filter of the type described, comprising a filter head; a container; a filter element in said container and spaced therefrom to form an inlet space; said head comprising a main head part and a subsidiary part; said main head part having an inlet and an outlet; a downwardly projecting integral central hollow boss formed on said mean head part and communicating with said outlet; said subsidiary head part comprising an inner ring slidably arranged on said hollow boss, an outer ring spaced radially from said inner ring and forming an annular space in communication with said inlet, a base connecting said inner and outer rings and forming an upper pressure plate for said filter element, a plurality of ports in said outer ring through which said annular space in said subsidiary head part communicates with the inlet space between said container and said filter element, a hollow projection coaxial with said inner ring and terminating in a threaded boss and in communication with said hollow boss, and a plurality of ports in said projection placing the interior of said filter element in communication with said outlet; complementary cooperating means formed on said container and on said outer ring for holding said container against said main head part; a bottom pressure plate for said filter element; a spring reacting against said bottom pressure plate and the base of said container and urging said filter element against the base of said subsidiary head part; and constraining means threaded into said projection for securing said subsidiary head part to said main head part, for rendering said complementary cooperating means effective to hold said container against said head, and for applying a compressive force to said spring.

11. The combination set forth in claim 10, including a sludge pot surrounding and spaced from said filter element, the bottom of said sludge pot being formed by said bottom pressure plate, said sludge pot being provided with longitudinal fins adapted to fit in close proximity to the inside of said container.

12. The combination set forth in claim 10, wherein said bottom pressure plate is provided with a plurality of circumferentially spaced radial stops, said stops being spring urged outwardly into contact with the inside of said container thereby to act as a pressure plate centering means and frictionally to engage said pressure plate in said container during a dismantling operation.

CAMILLE CLARE SPRANKLING LE CLAIR.

REFERENCES CITED

The following references are of record in the file of this patent:

UNITED STATES PATENTS

| Number | Name | Date |
|---|---|---|
| 1,172,689 | Elliott | Feb. 22, 1916 |
| 1,613,166 | Gregory | Jan. 4, 1927 |
| 1,710,758 | Wright | Apr. 30, 1929 |
| 1,744,837 | Pelletier | Jan. 28, 1930 |
| 1,797,198 | Ingersoll | Mar. 17, 1931 |
| 1,840,883 | Brecher | Jan. 12, 1932 |
| 2,057,219 | Vokes | Oct. 13, 1936 |
| 2,057,932 | Bolser | Oct. 20, 1136 |
| 2,071,996 | Baldwin | Feb. 23, 1937 |
| 2,175,775 | Hurn | Oct. 10, 1939 |
| 2,226,045 | Baldwin | Dec. 24, 1940 |
| 2,287,344 | Easton et al. | June 23, 1942 |
| 2,418,777 | Le Clair | Apr. 8, 1947 |

FOREIGN PATENTS

| Number | Country | Date |
|---|---|---|
| 787,482 | France | July 8, 1935 |